Aug. 3, 1965     J. HINTZE     3,197,882
DIRECTIONAL GYROSCOPIC INSTRUMENT
Filed July 31, 1961
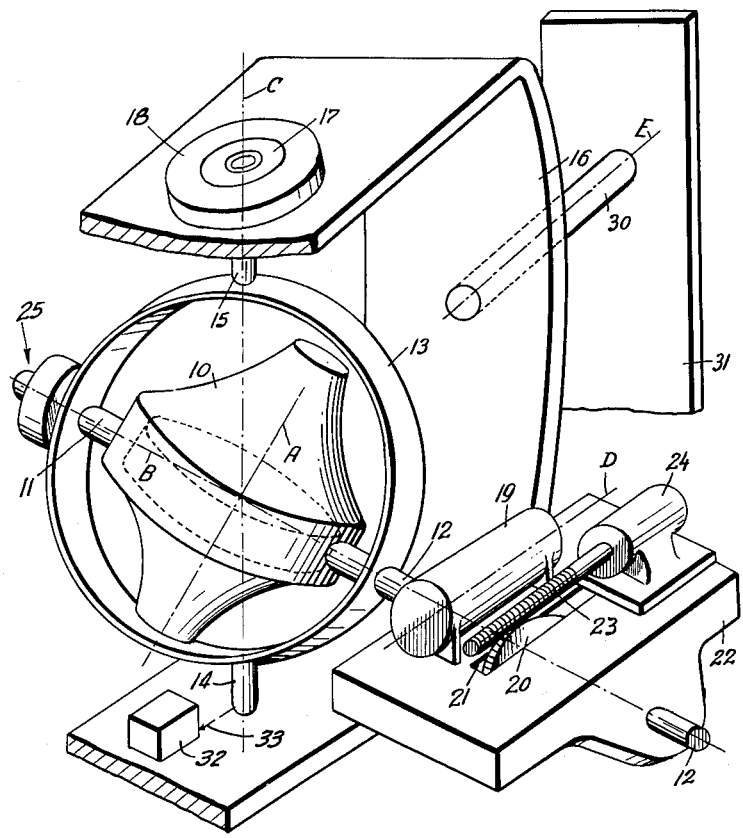
Inventor
JOHANNES HINTZE

United States Patent Office 3,197,882
Patented Aug. 3, 1965

3,197,882
DIRECTIONAL GYROSCOPIC INSTRUMENT
Johannes Hintze, Kiel, Germany, assignor to Anschutz & Co. G.m.b.H., Kiel-Wik, Germany, a limited-liability company of Germany
Filed July 31, 1961, Ser. No. 127,977
Claims priority, application Germany, Aug. 5, 1960, A 35,301
3 Claims. (Cl. 33—222)

My invention relates to a directional gyroscopic instrument including a gyroscope mounted for free pivotal universal movement in an indifferent equilibrium condition and provided with torque-producing means for stabilizing the axis of spin relative to the horizon under control by a spirit level or other inclination-responsive means.

In prior directional gyroscopic instruments of this type the spirit level is mounted to extend parallel to the plane including the axis of spin of the gyroscope and the substantially horizontal pivotal axis of the means for mounting the gyroscope support, and the spirit level so mounted is operative to maintain this plane in horizontal condition with the aid of the torque producer. As the gyroscope tends to maintain the direction of its axis of spin in space, the rotation of the earth causes a tendency of the axis of spin to wander out of the horizontal position. Therefore, it must be continually returned to the horizontal position by the torque exerted by said torque producer. Moreover, the rotation of the earth results in a tendency of the spin axis to wander out of the meridian. Therefore, the gyroscope must be controlled by a second torque for the maintenance of the axis of spin within the meridian. Ordinarily this second torque is controlled by a magnetic compass involving the disadvantage that the directional gyroscope can indicate the magnetic heading only. Attempts of properly controlling the magnitude of the second torque by way of computation have not been satisfactory as the magnitude depends on a number of factors including the velocity of flight with respect to the ground and the heading. As the exact magnitude of these factors is not known, the result is inaccurate.

As the means for mounting the support of the gyroscope rotor for universal pivotal movement include bearings which are subjected to a load produced by the erecting torque controlled by the spirit level and, even with the best possible finish, have a definite coefficient of friction, frictional torques are produced in said mounting which act on said support about the horizontal pivotal axis thereof and, therefore, produce a precessional movement of the axis of spin about the vertical axis, whereby the indication of the heading will be falsified.

It is an object of my invention to provide an improved directional gyroscopic instrument in which the level-controlled erecting torque producer needs to be put into operation upon expiration of large intervals only and for short periods of time and in which the second torque producer may be dispensed with.

As a result, the frictional torque above referred to will be effective at great intervals and for very short periods of time whereby the accuracy of the instrument is greatly enhanced.

Further objects of my invention will appear from a detailed description of a preferred embodiment thereof following hereinafter with reference to the drawings. I wish it to be understood, however, that my invention is in no way restricted to such details but is capable of numerous modifications within the scope of the appended claims and that the terms and phrases used in such detailed description have been chosen for the purpose of explaining my invention rather than that of restricting or limiting the same.

With the aforesaid objects in view, my invention consists in the novel combinations and arrangements of parts hereinafter described in their preferred embodiment, pointed out in the subjoined claims and illustrated in the annexed drawing, in which my improved directional gyroscopic instrument is shown in perspective and in a diagrammatic fashion, the supporting frame being partly broken away.

The gyroscope rotor diagrammatically indicated by broken lines is mounted in and carried by a support 10 so as to spin about the axis A. The support 10 is formed in the conventional manner by a housing surrounding the rotor and being shaped as a body of revolution coaxial to the axis A. A pair of opposite trunnions 11 and 12 coaxial to an axis B are fixed to the periphery of the support of housing 10 and are journaled in bearings fixed to a gimbal ring 13. A pair of opposite trunnions 14 and 15 coaxial to a vertical axis C are fixed to the gimbal ring in diametrically opposite relationship and are journaled in a suporting frame 16. Each of the axes A and C extends at right angles to the axis B intersection it in a common point which coincides with the common center of gravity of the gyroscope rotor and its support 10, and the elements carried thereby.

From the above it will be appreciated that the support 10 is mounted on the frame 16 by the mounting means including the gimbal ring 13 and the two pairs of trunnions 11, 12 and 14, 15 for free pivotal universal movement about the intersection of the axes A, B and C in an indifferent equilibrium condition. As a result, the axis A of spin will maintain its direction in space irrespective of the movements of the aircraft or vessel on which the instrument is mounted. The supporting frame 16 is so mounted on the aircraft or vessel that the vertical axis C remains vertical. For this purpose the frame 16 may be carried by a float or may form a second gimbal ring having a pair of opposite trunnions coaxial to a horizontal axis E. These trunnions one of which is shown at 30 may be journaled in bearings carried by suitable standards 31. The axis E extends through the intersection point of the axis A, the axis B and the axis C.

On the trunnion 15 the rotor 17 of an electrical erecting motor or torque-producer is fixed, the stator 18 thereof being fixed to the frame 16. The torque producer may be formed by an asynchronous A.C. motor having a rotor of the squirrel cage type, the stator 18 being provided with two sets of windings for energization by A.C. currents having a phase difference of 90°. The direction of the torque can be reversed by reversal of one of the currents. The current to be reversed is controled in a known manner by a spirit level 19 including a plurality of electrodes. As such spirit levels and the control of an erecting motor thereby is well known in the art, a detailed description thereof is deemed dispensable herewith. When the axis D of the spirit level assumes its horizontal position, the set of reversal windings of the stator 18 is deenergized. It will be energized in one or the other sense of rotation, when the axis D is inclined in one or the other direction. As a result, a torque will be exerted upon the rotor 17 or the erecting motor and on the gimbal ring 13 connected therewith by the trunnion 15 about the axis C. This erecting torque produces a precessional movement of the axis of spin A about the axis B.

The trunnion 12 extends through the bearing provided by the gimbal ring 13 and on its projecting end portion carries a worm-wheel 20 fixed thereto. This worm-wheel extends upwardly through a slot 21 of a platform 22 which is pivotally mounted on trunnion 12. A worm 23 meshes with the worm-wheel 20 and is carried by the rotor of a setting motor 24 whose stator is fixed to the platform 22, the axis of the worm 23 extending parallel to the platform 22. The spirit level 19 is so fixed to the platform that its axis D likewise extends parallel thereto and at right angles to the axis B.

It has been stated hereinabove that the gyroscope is mounted for free pivotal universal movement in an indifferent equilibrium condition. Therefore, it is a requirement that the common center of gravity of the housing 10 and the elements 11, 12 and 19–24 carried thereby must be located on the axis B and that the common center of gravity of the gimbal ring 13 and the elements 11, 12, 14, 15, 17 and 19–24 carried thereby be disposed on the axis C. The common center of gravity of these elements and of the frame 16 and the elements 18 and 30 carried thereby must coincide with the intersection of the axes A, B and C. This can be readily achieved by appropriate weight distribution which may involve the provision of counter weights. As a result, the torque exerted about the axes B, C and E by the weight of the elements of the instrument will be reduced to a minimum thus preventing precession of the gyroscope to the utmost possible extent.

The setting motor 24 is a conventional synchro receiver motor adapted to be electrically connected to a synchro transmitter so as to rotate synchronously therewith. The rotor of a second erecting motor 25 may be fixed to the trunnion 11, whereas the stator of this erecting motor is fixed to the gimbal ring 13. This motor too may be formed by an asynchronous motor having reversing phase windings controlled in the conventional manner by a magnetic compass. Should the axis of spin A wander about the vertical axis C out of the meridian plane, the magnetic compass will respond to such movement and will operate the second erecting motor 25 in such a sense as to cause the axis of spin A to perform a precessional movement back into the plane of the meridian.

For this purpose, a comparer and a declination corrector are provided for controlling motor 25 so as to maintain the geographic meridional orientation of the axis A. Such comparers and declination correctors are well-known in the art and, therefore, need not be described in detail. It will suffice to diagrammatically indicate the angular position pick-off 32 which is responsive to the angular position of the gimbal 13 with respect to the outer gimbal 16. The connection between the inner gimbal 13 and the angular position pick-off 32 may be electrical or inductive. It is diagrammatically indicated by the broken line 33. Angular position pick-off devices of this type are known in the art and any desired form may be used. The comparer receives a first input signal from the pick-off 32 and a second input from a magnetic heading reference device including a magnetic compass. These two inputs cause the comparer to produce a potential whose direction and magnitude depends on any deviation of the plane containing the axes A and C from the meridian. This potential is supplied to the motor 25.

As the control of the erecting motor 25 by such a magnetic compass is well known in directional gyroscopic instruments, a detailed description thereof and an illustration may be dispensed with.

The setting motor 24 may be caused by suitable manipulation of the synchro transmitter connected thereto or by a suitable control switch to rotate in one or the other direction of rotation causing the worm 23 engaging the worm-wheel 20 to effect a relative turn between the trunnion 12 and the platform 22 to which the spirit level 19 is fixed. By this turn the spirit level may be so adjusted that the angle between its axis D and the plane including the axes A and B equals the geographical latitude. As a result, the axis of spin A will extend parallel to the axis of rotation of the earth as long as it is kept within the plane of the meridian. Therefore, the rotation of the earth will not tend to change the angle of inclination of the axis of spin A to the horizontal and will not result in any operation of the torque producer 17, 18.

From the above it will be appreciated that in the directional gyroscopic instrument described hereinabove the erecting motor or torque producer 17, 18 will be put in operation on comparatively rare occasions only and for brief periods of time.

The setting motor 24 may cooperate in the conventional manner with a potentiometer system causing the motor 24 to turn the platform 22 to the desired angle with respect to the worm-wheel 20 and to stop, when such angle has been reached.

Before the instrument is put into operation, the gimbal ring 13 is adjusted into the east-west-plane and the inclination of the axis of spin A is adjusted to the geographical latitude. When these adjustments have been effected, the instrument is put in operation. In such operation, the torque producers can be left entirely deenergized for comparatively extended intervals without incurring the risk of any falsification of the indication of the heading by the rotation of the earth or by the magnetic compass. During this interval which may last through the entire duration of a flight, the heading will be more accurately indicated than was possible with prior directional gyroscopic instruments.

In the embodiment illustrated in the drawing an oscillation of the supporting frame 16 about the axis B will be transferred to the gimbal ring 13 but will not be transferred to the support 10 and the platform 22 rigidly connected with the support 10 by the trunnion 12 and carrying the spirit level 19.

The erecting motor 25 may serve a useful purpose during flights across the pole in which the axis of spin A cannot be adjusted so as to extend parallel to the axis of the earth. In this event the second erecting motor 25 may produce a torque corresponding to the rotation of the earth, when the axis of spin A has been adjusted into a horizontal position. In this event my instrument in a known manner offers the possibility of flying on a great circle of the globe.

From the above description it will be understood that the spirit level 19 constitutes control means connected for common movement with the support 10 and responsive to any departure of the axis A of spin from a selected inclination and connected with the torque producer 17, 18 to control same in response to said departure to maintain the selected inclination of the axis A constant. The worm-wheel 20, the worm 23 and the setting motor 24 constitute adjusting means which connect the support 10 with the control means 19 for variably adjusting the angular relationship of the control means 19 to the support 10 about the horizontal axis B which extends transversely to the axis A and C. Moreover, it will be understood, that suitable adjustment of the worm-wheel 20 relative to the platform 22 by the setting motor 24 makes it possible to adjust the value of the angle between axes A and C so as to correspond to the geographical latitude.

The advantages of the invention as here outlined are best realized when all of its features and instrumentalities are combined in one and the same structure, but useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

From the foregoing it will be seen that this invention is one well adapted to attain all of the ends and objects hereinabove set forth, together with other advantages which are obvious and which are inherent to the apparatus.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A directional gyroscopic instrument comprising a support, a gyroscope rotor rotatably mounted on said support, a gimbal, means mounting said support on said gimbal for rotation about a horizontal axis disposed at right angles to the axis of said rotor and intersecting the axis of said rotor, a frame, means mounting said gimbal on said frame for rotation about a vertical axis intersecting said axes in their point of intersection, a reversible torque producer mounted on said frame and connected to the second-named mounting means for exerting a torque about said vertical axis thereby to cause a precessional movement varying the inclination of the axis of said rotor, control means mounted to move independently of said gimbal about said horizontal axis and responsive to any departure of the axis of rotation of said rotor from a selected inclination and connected to said torque producer to control the same in response to said departure to maintain constant said selected inclination, a motor and means connecting said motor with said support and said control means for variably adjusting said control means about said horizontal axis relative to said support independently of said gimbal, said support and the parts rotatable therewith being in neutral equilibrium about said horizontal axis, whereby the axis of said rotor may be maintained selectively either inclined at the geographical latitude or in a horizontal position.

2. A directional gyroscope as claimed in claim 1, wherein said control means is a spirit level positioned with its longitudinal axis at right angles to said horizontal axis and mounted to be adjustable so that the angle between said longitudinal axis and a plane containing said horizontal axis and the axis of said rotor equals the geographical latitude.

3. A directional gyroscope as claimed in claim 1 wherein a second torque producer is mounted coaxial with said horizontal axis to exert a torque between said gimbal and said support, and said second torque producer is a motor having reversing phase windings and is adapted to be controlled by a magnetic compass so that the axis of said rotor will perform a precessional movement into the plane of the meridian.

References Cited by the Examiner

UNITED STATES PATENTS

| 1,380,336 | 5/21 | Paxton | 33—222.7 |
| 2,255,899 | 9/41 | Ross | 33—226 |
| 2,380,932 | 8/45 | Bates | 33—222.7 |
| 2,630,017 | 3/53 | Slater | 74—5.34 X |
| 2,657,471 | 11/53 | Thomas et al. | 33—222.7 |
| 2,879,671 | 3/59 | Schulte | 74—5.47 |

FOREIGN PATENTS

| 129,724 | 7/19 | Britain. |
| 754,775 | 11/44 | Germany. |

OTHER REFERENCES

Selsyns for Remote Signaling, Control, and Indication (GEA–722B) (8 pp. including covers), published by General Electric Company Schenectady, N.Y., received in Division 62 Feb. 16, 1939.

ROBERT B. HULL, *Primary Examiner.*